(12) United States Patent
Palazzolo

(10) Patent No.: US 6,620,069 B2
(45) Date of Patent: Sep. 16, 2003

(54) POWER TRANSFER UNIT

(75) Inventor: Joseph Palazzolo, Livonia, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/034,101

(22) Filed: Dec. 28, 2001

(65) Prior Publication Data

US 2003/0040392 A1 Feb. 27, 2003

Related U.S. Application Data

(60) Provisional application No. 60/314,823, filed on Aug. 24, 2001.

(51) Int. Cl.[7] .................. F16H 37/08; F16H 37/02; F16H 48/06; B60K 17/342
(52) U.S. Cl. ............... 475/198; 475/210; 475/221; 180/251
(58) Field of Search ................... 475/198, 203, 475/204, 210, 211, 212, 213, 218, 221, 225, 230; 180/248, 251

(56) References Cited

U.S. PATENT DOCUMENTS

| | | | | |
|---|---|---|---|---|
| 5,017,183 | A | * | 5/1991 | Teraoka ............... 475/150 |
| 6,076,623 | A | * | 6/2000 | Teraoka et al. ........ 180/233 |
| 6,093,127 | A | * | 7/2000 | DiDomenico et al. ... 475/230 |
| 6,422,967 | B1 | * | 7/2002 | Krisher ............... 475/230 |

* cited by examiner

*Primary Examiner*—Sherry Estremsky
*Assistant Examiner*—Tisha D. Lewis
(74) *Attorney, Agent, or Firm*—Brinks Hofer Gilson & Lione

(57) ABSTRACT

A motor vehicle power transfer unit for distributing torque between a front wheel drive line and a rear wheel drive line. The power transfer unit includes an input portion, an output portion, a non-parallel gear set and a parallel gear set. The input portion is adapted to connect to an output portion of the transmission assembly and the output portion is adapted to connect to an input portion of the rear wheel drive line. The non-parallel gear set is coupled to the input portion and transfers power to the parallel gear set, which is coupled to the output portion. A front wheel differential located in the power transfer unit, may also be coupled to the input portion.

26 Claims, 3 Drawing Sheets

POWER TRANSFER UNIT

CROSS-REFERENCE TO RELATED APPLICATIONS

The present this invention claims priority to U.S. provisional application Serial No. 60/314,823, filed Aug. 24, 2001, entitled "Power Transfer Unit".

BACKGROUND

1. Field of the Invention

The present invention relates to the power train of a motor vehicle. More specifically, the present invention relates to a power transfer unit in the power train for distributing power to the front and rear wheels of the vehicle.

2. Description of the Prior Art

In the past, most automobiles in the United States utilized a rear wheel drive power delivery scheme. In adapting these rear wheel drive schemes into four wheel drive applications, a transfer case was, and often still is, positioned at the output of the transmission assembly. When engaged, the transfer case diverts a portion of the power coming from the transmission assembly from the rear wheels to the front wheels.

Currently in the United States, a significant portion (if not a majority) of new automobiles are front wheel drive based vehicles. In a front wheel drive vehicle, both the engine and the transmission assembly are typically transversely oriented in the vehicle. By positioning the power plant and transmission assembly transversely in the vehicle, more direct coupling of the transmission assembly to the vehicle's transaxle and front wheels can be achieved. In doing so, a front wheel differential is incorporated directly into the transmission assembly itself.

With front wheel drive vehicles themselves becoming a mature market, a recent trend in the automobile industry has been to adapt these front wheel drive schemes for all or four wheel drive applications. This is accomplished by providing a power transfer unit that diverts a portion of the power from the front wheels to a rear wheel drive shaft and subsequently the rear wheels.

Seen in FIGS. 1a and 1b is a typical prior art power transfer unit 10. Such a power transfer unit 10 couples to the transversely oriented output of the transmission assembly and includes a housing 12 within which is located a gear set 14 comprised of a parallel gear set 16 and a non-parallel gear set 18.

The parallel gear set 16 includes a cylindrical extension 20 that operates as its input and is coupled to the output 22 of the transmission assembly by way of a splining engagement 24. The cylindrical extension 20 itself extends off of a first gear wheel 26 or may be a sleeve to which the gear wheel 26 mounts.

From the first gear wheel 26, power is transferred through a second and third gear wheel, respectively 32 and 34, each supported on bearings 36 for rotation about axes 38 and 40 parallel to the rotational axis 28 of the first gear wheel 26.

The non-parallel gear set 18 includes a bevel ring gear 44 that is mounted to a shaft or sleeve 42 onto which the third wheel gear 34 is also mounted. The bevel ring gear 44 engages a bevel gear 46 mounted to another shaft 48 whose axis is generally perpendicular (and therefore non-parallel) to that of shaft 42. Mounted to an opposing end of the shaft 48 is an output member 50 that includes a flange 52 and appropriately located bolt openings 54. The latter features enable the output member 50 to be bolted to a rear drive shaft (not shown).

As seen in FIG. 1a, the axis 56 along which the parallel gear set 16 engages with one another corresponds with the axis about which the output member 50 rotates. As a result of the locating of the power transfer unit 10 relative of to the output of transmission 22, it is clear that this axis 56 may be offset from the centerline of the vehicle. As seen in FIG. 1b, the axis 28 of input into the power transfer unit 10, is vertically or elevationally offset relative to the output axis 58 about which the output member 50 rotates. This "drop" or height decrease results from the relative positioning of the first, second and third helical gears 26, 32 and 34 of the parallel gear set 16. The non-parallel gear set 18 is a hypoid beveled gear set in that the axis of rotation 40 of the bevel ring gear 44 does not intersect the axis 58 of rotation of the bevel gear 46.

While prior power transfer units work sufficiently well for-their intended purposes, their construction limits the extent to which their size can be reduced (thereby making the engine bay unavailable for other components). This also limits packaging flexibility of the units themselves. Normally front differentials in transaxles are of the bevel type and require a large amount of axial space. As the transaxle package grows axially, it interferes with having equal length halfshafts and furthermore steering, suspension, and engine mount/roll restrictor placement. Additionally, current power transfer units utilize a series of helical gears, spur gears or a chain gear to initially receive power from the transmission assembly. While not seen in FIGS. 1A and 1B, power may then be provided to a bevel gear set and subsequently to the rear wheel drive shaft. This scheme applies a significant amount of torque to helical (or other type) gears and also imparts significant bending forces into the drive train. The latter drawback occurs because of the distance between the bevel gear set's transverse axis and the output axis of the transmission assembly.

It is therefore an object of the present invention to overcome the above and other limitations of the prior art.

It is also an object of this invention to reduce the bending forces applied to the drive train.

A further object of this invention is to increase the available packaging space in the motor vehicle's engine bay.

Another object of this invention is to provide a power transfer unit having the front differential incorporated therein.

SUMMARY OF THE INVENTION

The present invention overcomes the limitations of the prior art by integrally packaging the primary components of a power transfer unit, a non-parallel gear set, a parallel gear set, and input and output members within a common housing. With the present invention, the non-parallel gear set is located to first receive, in conjunction with input of the power transfer unit, power being transmitted from the output of the transmission assembly.

The output of the transmission assembly is coupled to the input member and to a first bevel gear ring. The first bevel gear engages a second bevel gear, such as a hypoid pinion gear, mounted to or formed with a shaft; this shaft being oriented generally perpendicularly to the rotational axis of the hypoid ring gear.

On the opposing end of the shaft is a first gear wheel, the drive sprocket wheel, in the parallel gear set of the power transfer unit. The drive sprocket wheel transfers rotation to a second gear or sprocket wheel through a transfer chain. That second sprocket wheel is mounted on a shaft whose rotational axis is generally parallel to the rotational axis about which the drive sprocket wheel rotates. On the end of this shaft is the output member that then transfers power to the rear drive shaft of the vehicle.

As mentioned above, the power transfer unit of the present invention may, in a second embodiment, include a front wheel differential. Input into the front differential is through a ring gear coupled to rotate with the first bevel gear of the non-parallel gear set. Planet gears engage the ring gear and are supported by a carrier that in turn forms or is connected to one output of the front differential. The planet gears also engage a sun gear. The sun gear is mounted to the other differential output, one output being coupled to the left front wheel half-shaft with the other output being coupled to the right front wheel half-shaft. During normal straight line driving, these gears do not turn relative to each other. Rather, the entire planetary assembly rotates. During turning of the vehicle, these gears will rotate relative to one another. By incorporating a planetary style differential with the present invention, additional packaging space becomes available in order to provide adequate space for the helical gear set without adding to the overall transaxle space requirements.

By locating the non-parallel gear set so as to receive power from the transmission assembly, tighter packaging can be achieved in the power transfer unit, in particular along the longitudinal axis of the motor vehicle. By utilizing the non-parallel gear set before the parallel gear set, the parallel gear set can be positioned immediately adjacent, and as close as possible, to the transmission assembly thereby minimizing motion of the power transfer unit output via the close proximity to the powertrain roll axis. Transmitting power back to the centerline and at the desired height relative to the vehicle is readily accomplished through the parallel gear set as well. This further enables the offset in a hypoid bevel gear to be reduced thereby increasing the efficiency of the non-parallel gear set.

Additionally, the front wheel differential can be incorporated into the power transfer unit, increasing packaging flexibility. This readily allows for the conversion of front wheel drive vehicles into all wheel drive vehicles with a minimum impact on the other components packaged in the engine bay.

In one aspect, the present invention is therefore seen to be a power transfer unit comprising an input member adapted to connect to an output portion of a transmission assembly; an output member adapted to connect to an input portion of a rear wheel drive shaft; a non-parallel gear set coupled to receive power from the input member and deliver it to a parallel gear set; and the parallel gear set being coupled to deliver power to the output member.

In another aspect, the invention comprises the features recited in the previous paragraph and further a front wheel differential. The input of the front wheel differential is also directly coupled to the input member of the power transfer unit. The outputs of the front wheel differential provide the power to the front right and left half-shaft assemblies.

Additional objects and features of the present invention will be readily apparent to those skilled in the art from a review of the attached drawings, the following detailed description and the appended claims.

DETAILED DESCRIPTION OF THE PREFERRED EMBODIMENTS

Figures 1A, 1B:
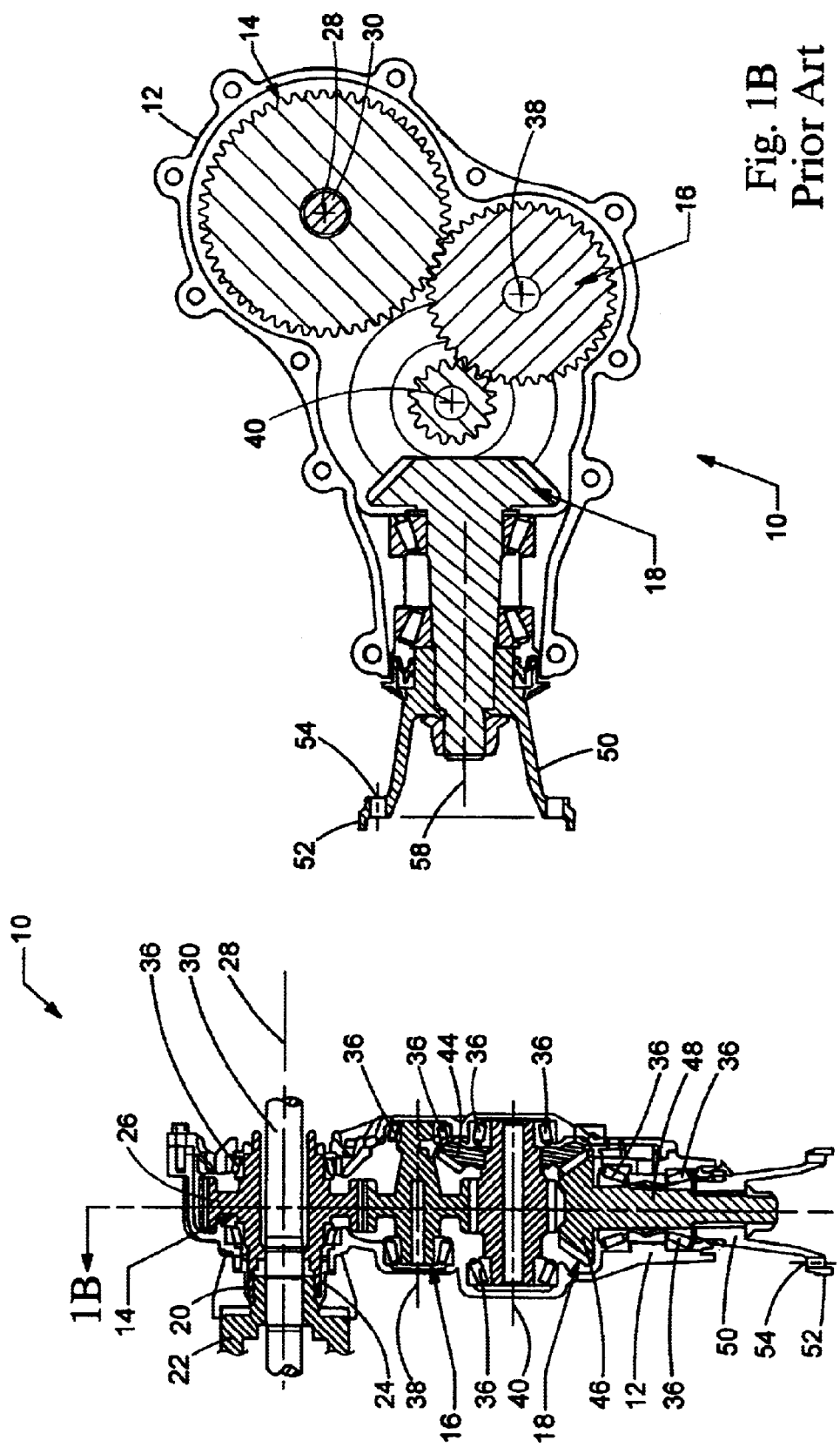
FIG. 1a is a cross-sectional view of a power transfer unit according to the prior art.
FIG. 1b is a cross-sectional view, taken generally along line 1b—1b in FIG. 1a, further illustrating a power transfer unit according to the prior art.
Figure 2:
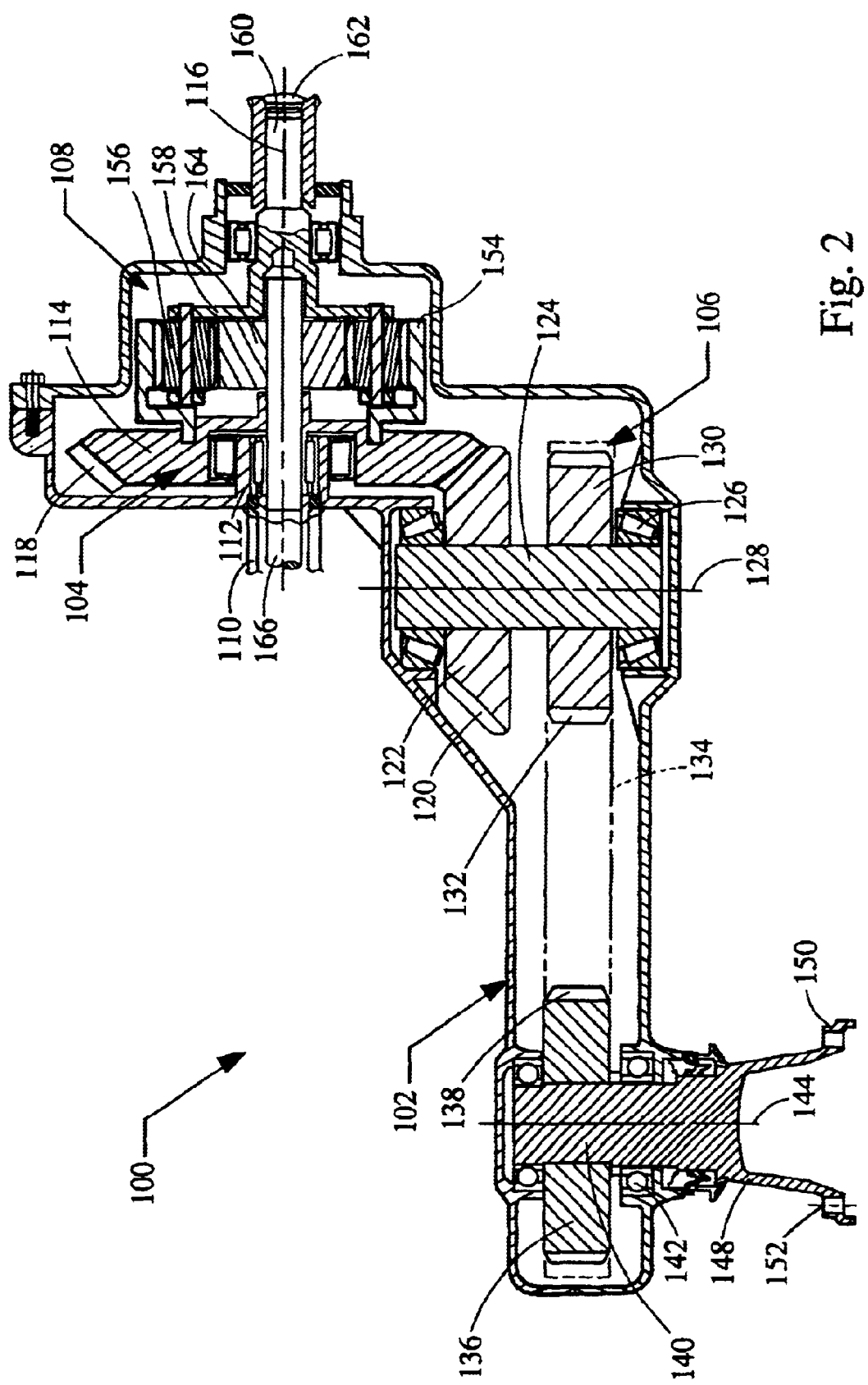
FIG. 2 is a cross-sectional view of a power transfer unit according to the principles of the present invention.
Figure 3:
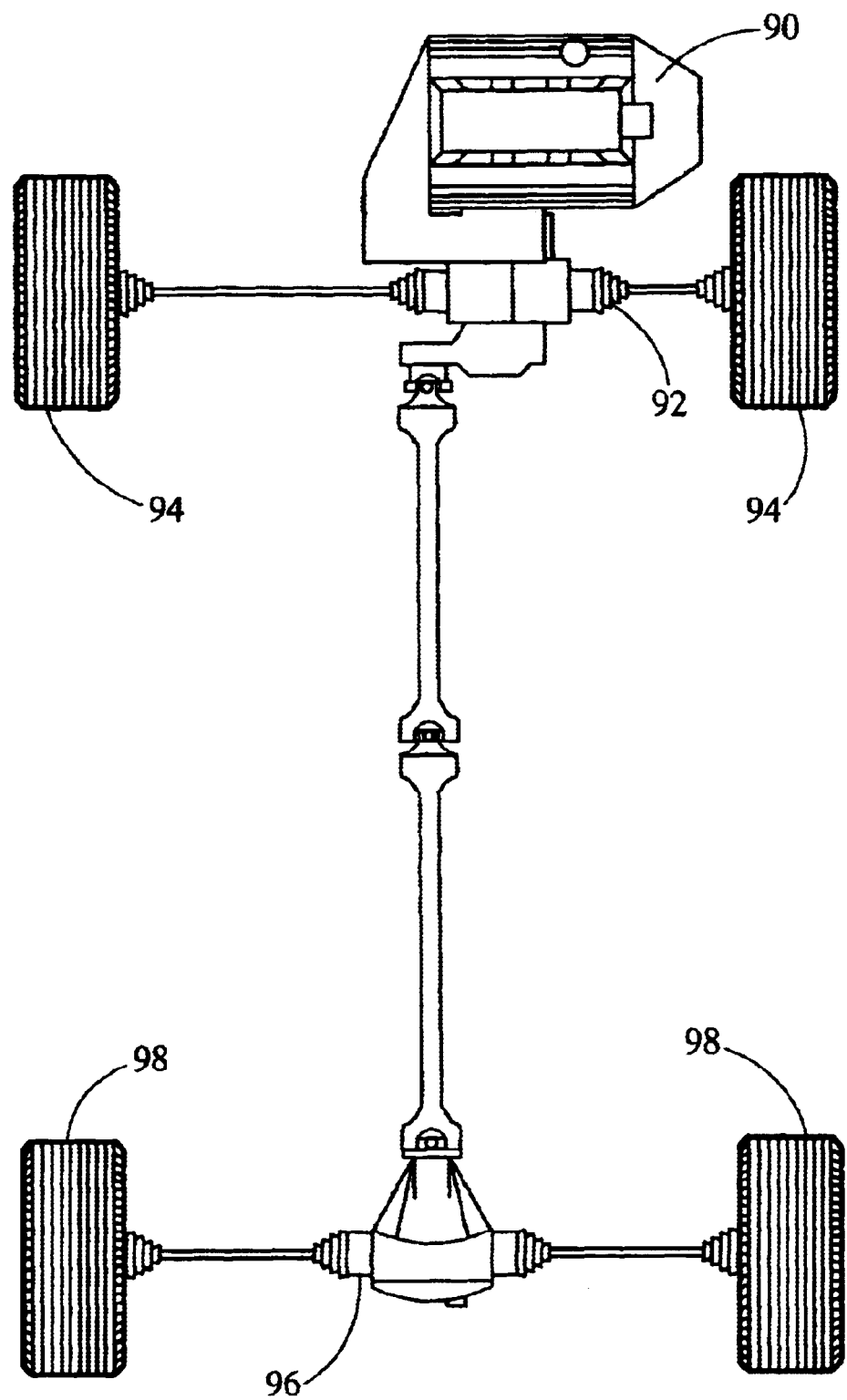
FIG. 3 is a view of a vehicle driveline according to the present invention.

Referring now to the drawings, FIG. 3 illustrates a vehicle driveline having an engine 90, a front drive line 92 having front wheels 94, and a rear drive line 96 having rear wheels 98. The vehicle drive line further includes a power transfer unit 100 of the present invention. Referring to FIG. 2 The power transfer unit 100 includes a housing 102 in which the primary components of the unit 100 are integrally packaged. These components principally include a non-parallel gear set 104, a parallel gear set 106 and may additionally include a front wheel differential assembly 108.

As used herein, the term "parallel gear set" is intended to refer to any mechanism (including, without limitation, mechanisms with gear wheels, mechanisms without gear wheels, gear trains, chain gears and belt systems), which transfers power from a first shaft to a second shaft; the first and second shafts defining axes that are generally parallel to one another.

As used herein, the term "non-parallel gear set" is intended to refer to any mechanism (including, without limitation, mechanisms with gear wheels, mechanisms without gear wheels, gear trains, chain gears and belt systems for transferring power from a first shaft to a second shaft; wherein the first and second shaft define axes that are not generally parallel to one another.

As mentioned above, the primary components of the power transfer unit 100 are all integrally packaged together and provided within a common housing 102. The input and output members may or may not protrude from the housing depending on the specific design criteria of the power transfer unit and the application in which it is being employed.

Rotation from an output 110 of the transmission assembly is coupled to an input of the power transfer unit 100. As specifically illustrated in FIG. 2, the input is an externally splined cylindrical sleeve 112 and the output 110 is internally splined to engage the input 112.

A first bevel gear 114 is mounted to the sleeve 112 in a manner that enables the gear 114 to rotate with the sleeve 112 about an axis 116, which extends transversely relative to the vehicle. Teeth 118 of the first bevel gear 114 engage teeth 120 of a second bevel gear 122 and the second bevel gear 122 is mounted or otherwise carried on one end of a shaft 124. The shaft 124 is supported within the housing 102 by bearings 126 for rotation about an axis 128. This second axis 128 of the non-parallel gear set 104 is oriented generally perpendicularly to the first axis 116 and extends generally longitudinally with respect to the vehicle.

While not readily apparent in FIG. 2, the axes 116 and 128, about which the first and second bevel gears 114 and 122 respectively rotate, may be oriented such that the axes 116 and 128 intersect one another or do not intersect one another. In the latter situation, the non-parallel gear set is seen to be a hypoid bevel gear set.

Mounted generally toward the opposing end of the shaft 126 is a first gear wheel 130 of the parallel gear set 106. The first gear wheel 130 is mounted to the shaft 126 by conventional means so as to rotate with rotation of the shaft 126 and about axis 128. The first gear wheel 130 includes external teeth 132 or other features that aid in transferring rotation, by way of a belt or chain 134 (shown in phantom), or similar means, to a second gear wheel 136. As the specific design criteria will dictate, the second gear wheel 136 may be larger, smaller or the same diameter as the first gear wheel 130. The second gear wheel 136 is similarly provided with external teeth 138 to engage the chain 134.

The second gear wheel 136 is mounted on a second shaft 140 that is rotatably supported on bearings 142 within the housing 102. The axis 144 of the shaft 140 is generally parallel to the axis 128 of rotation of the first gear wheel 130.

The second shaft 140 is further used to transfer power out of the power transfer unit 100. In order to provide the output for the power transfer unit 100, a distal end 146 of the second shaft 140 is unitarily formed with, or alternatively provided with external splines to receive and engage, an output member 148. Retention of the output member 148 to the second shaft 140 can be by any conventional means, including a retainer nut threadably attached to the second shaft 140, where these components are not unitarily formed. A flange 150 provided with a series of bolt holes 152 enables the output member 148 to be readily connected to a rear drive shaft (not shown).

When incorporated into a motor vehicle, and as other design criteria may dictate, the height or elevation of the axes 128 and 144, relative to the vehicle and each other, may be the same or different. In the situation where axis 144 is lower than axis 128, it will be appreciated that the parallel gear set 106 operates as a chain drop.

As an alternative to the chain 134 or belt, a series of gear wheels or a gear train may be employed. Additionally, the relative diameters of the gear wheels 130 and 136 may be the same or different, as determined by design criteria not relevant to an understanding of the present invention.

By utilizing the parallel gear set 106 after the non-parallel gear set 104, it becomes possible to locate the parallel gear set 106 tightly against the housing of the transmission assembly. This is possible because the non-parallel gear set 104 requires less longitudinal space than would a comparable parallel gear set 106. With the parallel gear set 106 located adjacent to the transmission assembly, reduced "roll" forces are experienced by the transmission assembly and the remainder of the drive chain.

Use of the parallel gear set 106 after the non-parallel gear set 104 also more readily allows the drive line to be moved to the centerline of the vehicle and at the desired height. This is accomplished by changing the length of the chain 134. If the non-parallel gear set 104 were employed to move the drive line back to the vehicle's centerline, large diameter gears or gear rings would need to be used, creating additional problems relating to packaging size and other constraints.

As briefly mentioned above, the power transfer unit 100 of the present invention may additionally include a front wheel differential assembly 108 integrally packaged therewith. The front wheel differential assembly 108, illustrated in conjunction with the present invention, is a planetary gear differential, it being noted that other styles and varieties of differentials, such as bevel gear differentials and others, are well within the scope and understanding of this invention.

Input into the differential assembly 108 is through an internally toothed ring gear 154. The gear ring 154 is secured to or unitarily formed with the first bevel gear 114 and coaxially rotates therewith. Alternatively, the gear ring 154 may be secured to or formed with the input 112 of the power transfer unit 100. Provided in either of the above manners, the ring gear 154 will rotate with the input 112 and the first bevel gear 114 as rotation is received from the output 110 of the transmission assembly. Planet gears 158 engage the ring gear 154 and are rotatably supported by a carrier 158. The carrier 158 in turn forms or is connected to one of the outputs 160 of the differential assembly 108. In FIG. 2, this output 160 from the carrier 158 is in the form of a shaft coupled via splined engagement to drive the right front wheel half-shaft 162.

The planetary gears 156 also engage a sun gear 164 and the sun gear 164 is mounted (through a splined or other engagement) to an end of the left front wheel half-shaft 166. Accordingly, during turning of the vehicle, the planetary and sun gears 156 and 164 will rotate relative to one another permitting the inside and outside wheels (relative to the turn) of the vehicle to rotate at different speeds.

By incorporating the front wheel differential assembly 108 integrally into the power transfer unit 100, the numerous benefits over prior constructions are seen.

Increased packaging flexibility results and power can be diverted to the rear wheel drive portion of the power transfer unit without exceeding previous packaging constraints. This more readily allows for the conversion of front wheel drive vehicles into all wheel drive vehicles with a minimum impact on the other components packaged in the engine bay.

The foregoing discussion discloses and describes a preferred embodiment of the invention. One skilled in the art will readily recognize from such discussion, and from the accompanying drawings and claims, that changes and modifications can be made to the invention without departing from the true spirit and fair scope of the invention as defined in the following claims.

I claim:

1. A motor vehicle power transfer unit for distributing torque between a front wheel drive line and a rear wheel drive line, said power transfer unit comprising:

an input portion adapted to connect to an output portion of a transmission assembly;

an output portion adapted to connect to an input portion of the rear wheel drive line;

a non-parallel gear set coupled to said input portion of said power transfer unit; and a parallel gear set coupled between said non-parallel gear set and said output portion of said power transfer unit.

2. The power transfer unit of claim 1 wherein said non-parallel gear set is a bevel gear set.

3. The power transfer unit of claim 2 wherein said bevel gear set includes a first bevel gear coupled to said input portion.

4. The power transfer unit of claim 3 wherein said first bevel gear is mounted to said input portion.

5. The power transfer unit of claim 2 wherein said bevel gear set is a hypoid bevel gear set.

6. The power transfer unit of claim 1 wherein said parallel gear set is a chain gear including a first gear wheel and a second gear wheel, said first gear wheel being an input into said parallel gear set.

7. The power transfer unit of claim 6 wherein said non-parallel gear set is bevel gear set having first and second bevel gears, said second bevel gear being an output of said non-parallel gear set and being commonly mounted to a shaft with said first gear wheel.

8. The power transfer unit of claim 1 wherein said parallel gear set is a gear drop.

9. The power transfer unit of claim 1 wherein further comprising a front wheel differential coupled to said input portion and including left and right differential outputs adapted to connect to the front wheel drive line.

10. The power transfer unit of claim 9 wherein said front wheel differential is coupled to a portion of said non-parallel gear set.

11. The power transfer unit of claim 10 wherein said front wheel differential is coupled to a bevel gear in said non-parallel gear set.

12. The power transfer unit of claim 9 wherein said front wheel differential is a planetary gear set.

13. The power transfer unit of claim 9 wherein said front wheel differential is coaxial with a first bevel gear of said non-parallel gear set.

14. A motor vehicle power transfer unit for distributing torque from a transmission assembly between a front wheel drive line and a rear wheel drive line, said power transfer unit comprising:
- an input member adapted to connect to an output portion of the transmission assembly defining a first axis;
- an output member adapted to connect to an input portion of the rear wheel drive line defining a second axis;
- a parallel gear set defining generally parallel input and output axes, said parallel output axis being coextensive with said second axis;
- a non-parallel gear set defining generally non-parallel input and output axes, said non-parallel input axis being coextensive with said first axis, said non-parallel output axis being coextensive with said parallel input axis; and
- a common housing enclosing all of said input member, said output member, said non-parallel gear set and said parallel gear set together in an integrally packaged assembly.

15. The power transfer unit of claim 14 wherein said non-parallel gear set is a bevel gear set.

16. The power transfer unit of claim 15 wherein said bevel gear set is a hypoid bevel gear set.

17. The power transfer unit of claim 15 wherein said bevel gear set includes a first bevel gear coupled to said input member.

18. The power transfer unit of claim 17 wherein said first bevel gear is mounted to said input member.

19. The power transfer unit of claim 14 wherein said parallel gear set is a chain gear.

20. The power transfer unit of claim 14 wherein said parallel gear set includes a first gear wheel as an input, said first gear wheel being mounted to a shaft having a bevel gear of said non-parallel gear set also mounted thereto.

21. The power transfer unit of claim 14 wherein said parallel input axis is elevated relative to said parallel output axis when said power transfer unit is incorporated into the motor vehicle.

22. The power transfer unit of claim 21 wherein said parallel gear set is a gear drop.

23. The power transfer unit of claim 14 further comprising a front wheel differential including a differential input coupled to said input member said front wheel differential also including left and right differential outputs adapted to connect to the front wheel drive line.

24. The power transfer unit of claim 23 wherein said differential input is unitarily coupled with said non-parallel gear set.

25. The power transfer unit of claim 23 wherein said front wheel differential is a planetary gear set.

26. A drive system for a motor vehicle comprising:
- a prime mover;
- a transmission assembly coupled to said prime mover and including a rotatable output portion defining a first axis;
- a front drive line including a pair of front half-shaft assemblies coupled to one each of a pair of front wheels, said front drive line operating as a primary drive line for the motor vehicle;
- a rear drive line operating as a secondary drive line, said rear drive line including a rear drive shaft defining a second axis and being connected to a pair of rear half-shaft assemblies, and further including a pair of rear wheels coupled to one each of said rear half-shaft assemblies;
- an input member adapted to connect to said output portion of the transmission assembly;
- an output member adapted to couple to said rear drive line;
- a non-parallel gear set defining non-parallel input and output axes, said non-parallel gear set being coupled to said input member and said non-parallel input axis being coaxial with said first axis;
- a parallel gear set defining generally parallel input and output axes, said parallel gear set being coupled to said output member and said parallel output axis being coaxial with said second axis, said parallel input axis being coaxial with said non-parallel output axis; and
- a front wheel differential including a differential input coupled to said non-parallel gear set for rotation therewith, said front wheel differential also including left and right differential outputs adapted to connect to one each of said pair of front half-shafts.

* * * * *